(12) United States Patent
Gong et al.

(10) Patent No.: US 9,641,224 B2
(45) Date of Patent: May 2, 2017

(54) TRANSMITTING METHOD AND RECEIVING METHOD FOR SIMULTANEOUS INFORMATION AND ENERGY TRANSFER

(71) Applicant: South University of Science and Technology of China, Shenzhen (CN)

(72) Inventors: Yi Gong, Shenzhen (CN); Zidong Han, Shenzhen (CN); Yue Zhang, Shenzhen (CN)

(73) Assignee: South University of Science and Technology of China, Shenzhen (CN)

( * ) Notice: Subject to any disclaimer, the term of this patent is extended or adjusted under 35 U.S.C. 154(b) by 0 days.

(21) Appl. No.: 15/169,302

(22) Filed: May 31, 2016

(65) Prior Publication Data
US 2016/0285518 A1    Sep. 29, 2016

Related U.S. Application Data

(63) Continuation of application No. PCT/CN2015/075352, filed on Mar. 30, 2015.

(30) Foreign Application Priority Data

Mar. 25, 2015 (CN) .......................... 2015 1 0133428

(51) Int. Cl.
*H04B 5/00* (2006.01)
*H02J 50/10* (2016.01)
*H02J 50/80* (2016.01)

(52) U.S. Cl.
CPC ............ *H04B 5/0037* (2013.01); *H02J 50/10* (2016.02); *H02J 50/80* (2016.02); *H04B 5/0031* (2013.01)

(58) Field of Classification Search
CPC ..... H04B 5/0037; H04B 5/0031; H02J 50/80; H02J 50/10
See application file for complete search history.

(56) References Cited

U.S. PATENT DOCUMENTS

2014/0327320 A1    11/2014  Muhs et al.
2015/0303741 A1*   10/2015  Malik ................. H04B 5/0037
                                                                307/104

(Continued)

FOREIGN PATENT DOCUMENTS

| CN | 104022841 A | 9/2014 |
| CN | 104135454 A | 11/2014 |
| CN | 104135770 A | 11/2014 |

OTHER PUBLICATIONS

International Search Report issued for corresponding International Patent Application No. PCT/CN2015/075352 mailed on Dec. 31, 2015.

*Primary Examiner* — Ping Hsieh
(74) *Attorney, Agent, or Firm* — Myers Wolin, LLC

(57) ABSTRACT

A transmitting method and receiving method for simultaneous information and energy transfer comprises: determining a first pre-allocated parameter set of a first baseband signal based on a first optimized parameter set and according to a first optimized target and a first constraint condition set; determining a second pre-allocated parameter set of a second baseband signal based on a first optimized result and a second optimized parameter set and according to a second optimized target and a second constraint condition set; and processing the baseband signals into corresponding radio-frequency signals according to the first pre-allocated parameter set and the second pre-allocated parameter set and transmitting the radio-frequency signals through an antenna; the first baseband signal and the second baseband signal each being an information baseband signal or an energy (Continued)

baseband signal. Both the energy transfer efficiency and the information transfer rate are improved by optimizing the information signals and energy signals.

8 Claims, 2 Drawing Sheets

(56) References Cited

U.S. PATENT DOCUMENTS

| | | | | |
|---|---|---|---|---|
| 2016/0118805 A1* | 4/2016 | Swope | ................... | H02J 50/12 307/104 |
| 2016/0118834 A1* | 4/2016 | Swope | ................... | H02J 50/12 320/108 |

\* cited by examiner

TRANSMITTING METHOD AND RECEIVING METHOD FOR SIMULTANEOUS INFORMATION AND ENERGY TRANSFER

CROSS-REFERENCE TO RELATED APPLICATIONS

This application is a continuation of International Application PCT/CN2015/075352, filed on Mar. 30, 2015, which claims priority to Chinese Application No. 201510133428.8, filed Mar. 25, 2015, the contents of each of which are hereby incorporated by reference.

FIELD OF THE INVENTION

The present invention relates to a cross field of wireless communication technology and wireless energy transfer technology, and more particularly, to a transmitting method and a receiving method for simultaneous information and energy transfer.

BACKGROUND

Simultaneous Wireless Information and Energy Transfer is an emerging communication technology that integrates wireless communication technology and wireless energy transfer technology to allow simultaneous information and energy transfer through a wireless manner. With technology development, it becomes a trend to integrate an energy technology with a communication technology, which not only can provide high speed and reliable communications, but also can effectively ease the pressure of energy and frequency spectrum scarcity. Such a technology has significant applications in many aspects such as industry, medical treatment, infrastructure development, or the like. Simultaneous wireless information and energy transfer breaks through a conventional wireless communication means, considers the energy attributes simultaneously, integrates the wireless communication technologies and wireless energy transfer technologies to implement parallel and simultaneous information and energy transfer, and thus has wide applications and innovative significance. Based on its feature of simultaneous information and energy transfer, it is applied to various wireless terminals or devices that depend on a battery with limited capacity to provide electric energy, in other words it feeds power to the battery through collecting energy from signals, and thus extremely extends the standby time of the devices, reduces the device size and cost, greatly reduce the output of batteries, and greatly decrease the environment pollutions caused during the process of manufacturing and recycling the batteries. Based on its feature of non-contact type remote transfer, it can replace batteries or cables for supplying power, and thus greatly facilitates power supplying. Based on its features in aspect of stability and sustainability, it can replace conventional energy harvesters which are mainly dominated by natural energy harvesting (such as wind energy, solar energy, kinetic energy, etc.). In addition, simultaneous wireless information and energy transfer is widely applied in improving the people's livelihood, and thus can produce great social benefits: in medical field, all implanted medical devices, such as a cardiac pacemaker and a cardiovascular robot, have a severe battery energy shortage problem, while a device according to the simultaneous wireless information and energy transfer can avoid a secondary pain to the sufferers. Technically, Zheng Zuxiang, Wu Lenan, et al from Southeast University proposed an AMPSK ultra-narrowband modulation technology, and designed a frequency domain power splitter, in appellation No. of 201410396157.0 (China Patent) and titled "Frequency Domain Power Splitter of AMPSK Wireless Energy-carrying Communication System," on the basis of this modulation technology. However, because the frequency band of this technology is ultra-narrow, the information rate is greatly reduced, and power loss occurs during power distribution. Moreover, the power density may greatly exceed its safety level.

SUMMARY

In order to solve the foregoing technical problems, the present method provides a transmitting method and a receiving method for simultaneous information and energy transfer. A technical solution employed in the present method can be described as follows:

a transmitting method for simultaneous information and energy transfer, applied in a transmitting terminal device, comprising:

determining, by a transmitting terminal, a first pre-allocated parameter set of a first baseband signal based on a first optimized parameter set and according to a first optimized target and a first constraint condition set;

determining, by the transmitting terminal, a second pre-allocated parameter set of a second baseband signal based on a first optimized result and a second optimized parameter set and according to a second optimized target and a second constraint condition set; and processing the first baseband signal and the second baseband signal in baseband signals into corresponding radio-frequency signals according to the first pre-allocated parameter set and the second pre-allocated parameter set and transmitting the radio-frequency signals through an antenna;

wherein the first baseband signal and the second baseband signal are one of an information baseband signal and an energy baseband signal in the baseband signals, and the first baseband signal is different to the second baseband signal.

Based on the foregoing technical solution, the present method may be further improved.

Further, the transmitting terminal is a multicarrier transmitter, the first baseband signal is an energy baseband signal, and the first optimized target involves: minimizing the number of carriers for energy signals and the power of the energy signals while the constraint condition is tenable. The first constraint condition set includes:

the power collected by a receiver being greater than or equal to the minimum operating power required by the receiver in a unit time;

the sum power of the energy signals on sub-carriers being less than or equal to the total power of the energy signals; and the mean power spectral density on each sub-carrier frequency band being less than or equal to a predetermined parameter value.

The foregoing further technical solution has the advantageous effects that: wireless information transfer is conducted on the basis of wireless energy transfer, this can allow that the power collected by the receiver to reach a minimum power level required under a corresponding operating mode and therefore to ensure a normal operation of the receiver, whereby the stability and reliability of a system implementing the method is greatly enhanced. Moreover, because the power consumed by the circuit of the receiver for signal processing may be greater than the energy of the information signal per se, and the power of the energy signals in the technical solution according to the method may be greater than and even far greater than the power of the information signals per se, the further technical solution can greatly improve energy utilization ratio, reduce energy waste, and is more environmental-friendly.

Further, the first optimized parameter set includes one or more of the following parameters:
 a minimum operating power required by the receiver;
 a channel bandwidth on each sub-carrier;
 a mean power spectral density on each sub-carrier; and
 a channel parameter vector.

Further, the first pre-allocated parameter includes one or more of the following parameters:
 a sub-carrier allocation set for energy signals;
 a power allocation set for energy signals; and
 a total power of the energy signals.

Further, the transmitting terminal is a multicarrier transmitter, and the second baseband signal is an information baseband signal. The second optimized target involves: maximizing the information transfer rate while the second constraint condition set is tenable. The second constraint condition set involves: the power sum of the information signals on a sub-carrier being less than or equal to the total power of the information signals.

The foregoing further technical solution has the advantageous effects that: through optimization, the power is further allocated rationally, the communication rate is further increased, and the system performance is further improved.

Further, the second optimized parameter set includes one or more of the following parameters:
 a sub-carrier set for information signals;
 the number of sub-carriers for information signals; and
 a channel parameter vector.

Further, the second pre-allocated parameter set includes one or more of the following parameters:
 a power allocation set for information signals; and
 a sub-carrier allocation set for information signals.

Further, the energy signals are spreading in frequency spectrum and then modulated into a pre-allocated carrier frequency band.

The present disclosure also provides a receiving method for simultaneous information and energy transfer. The method is applied in a receiving terminal device, and comprises:
 receiving, by a receiving terminal, a radio-frequency signal transmitted by a transmitting terminal;
 separating and recovering the radio-frequency signal into an original baseband signal;
 wherein the original baseband signal comprises an information baseband signal and an energy baseband signal; and
 rectifying and converting the energy baseband signal into a direct current electric signal and storing the direct current electric signal into an energy storage unit.

The present method has the advantageous effects that: the transmitting method for simultaneous information and energy transfer according to the present method can be employed to transmit independent energy signals to a receiving terminal simultaneously while transmitting information signals, and thereby to provide sufficient energy to the receiver. In addition, the information signals and the energy signals are optimized through an optimizing algorithm, which not only can improve the energy transfer efficiency, but also can improve the information transfer rate.

Moreover, the methods are particularly applicable to modern or future medical devices implanted in a human body, for example, a cardiac pacemaker, an artificial heart, a cardiovascular robot, a lens eye, an electronic cochlea, an electronic achilles tendon, an electronic artificial limb, or the like. Simultaneous information and energy transfer can be conducted on the medical devices through the methods, which not only can feed power to the medical devices to ensure the normal operation of the medical devices and ensure the normal life of people needing these medical devices, but also can feed back pathological and human mechanism data through a mobile network in real time, and prevent accidents through modelling and prediction. Meanwhile, these large amount of data can be shared to medical specialists for data analysis, which greatly promotes the development of the medical treatment.

The methods are also applicable to wireless device, for example, a wireless low power consumption sensor network, can feed power without a battery, and particularly for disposing wireless sensor nodes in a complicated environment like a forest, a desert, an ocean, a nuclear power plant, a petrochemical plant or the like, a wireless manner is utilized to feed power and feed data back.

The method can be utilized to build a smart home environment, feeding power for such a mobile terminal like a mobile phone anytime and anywhere to ensure a normal conversation between users. With the method, the sensor is fed with power, a user is thus enabled to know such parameters like indoor and outdoor temperature and humidity, and accordingly to conduct control on households by means of a central control system in a smart manner, it is energy saving and environmental-friendly.

The present method can greatly reduce the battery usage and output for wireless devices, greatly reduce the environment pollutions caused during the process of manufacturing, using and recycling the batteries. The method is a technology that is very beneficial for improving the green economy of a country.

DETAILED DESCRIPTION OF THE PREFERRED EMBODIMENTS

The principles and features of the present invention will be described hereinafter with reference to the drawings, and the examples illustrated are only used to interpret the present invention, but are not intended to define the scope of the present invention.

Figure 1:
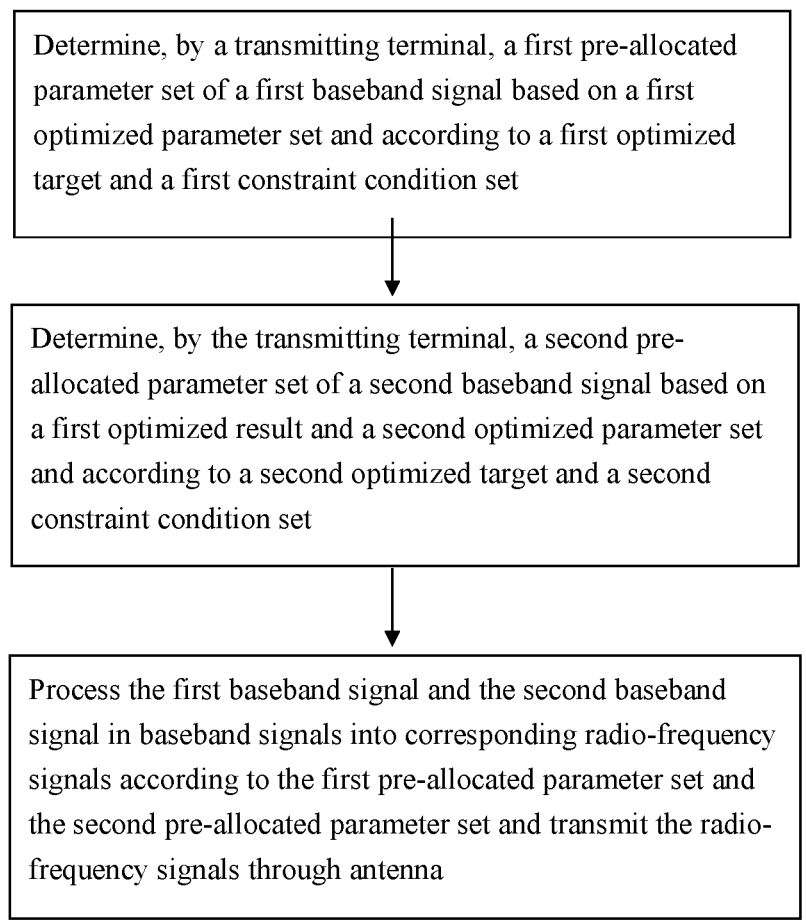
FIG. 1 is a flow diagram of a transmitting method for simultaneous information and energy transfer.

FIG. 1 is a flow diagram of a transmitting method for simultaneous information and energy transfer. As shown in FIG. 1, a transmitting method for simultaneous information and energy transfer the method may be applied to a transmitting terminal device, the method comprises: determining, by a transmitting terminal, a first pre-allocated parameter set of a first baseband signal based on a first optimized parameter set and according to a first optimized target and a first constraint condition set; determining, by the transmitting terminal, a second pre-allocated parameter set of a second baseband signal based on a first optimized result and a second optimized parameter set and according to a second optimized target and a second constraint condition set; and processing the first baseband signal and the second baseband signal in baseband signals into corresponding radio-frequency signals according to the first pre-allocated parameter set and the second pre-allocated parameter set and transmitting the radio-frequency signals through an antenna; wherein the first baseband signal and the second baseband signal is one of the an information baseband signal and an energy baseband signal in the baseband signals, and the first baseband signal being different to the second baseband signal.

An optimization process will be explained specifically through a specific embodiment.

In the embodiment, the transmitting terminal is a multi-carrier transmitter, the first baseband signal is an energy baseband signal, and the second baseband signal is an information baseband signal. In the embodiment, the energy baseband signal is served as the first baseband signal, and the information baseband signal is served as the second baseband signal. On the basis of energy baseband signal optimization, the information baseband signal is optimized thenafter, this can ensure that the power collected by the receiver can reach the minimum power required for a corresponding operating mode and thus ensures the normal operation of the receiver, this also can greatly enhance the system stability and reliability. Through the optimization on the information baseband signal, the power is further allocated rationally, the communication rate is further increased, and the system performance is thus further improved.

It is provided that the total power of the baseband signal of the transmitting terminal is P, and the total powers allocated to the information baseband signal and the energy baseband signal are $P_I$ and $P_E$, respectively, then $P_I+P_E=P$. The total carrier set of the signals is Sc, and $Sc=Sc_E \cup Sc_I$, wherein $Sc_E$ is the sub-carrier set for energy signals, and $Sc_I$ is the sub-carrier set for information signals. The energy collected by the receiving terminal is Q, then $Q=\beta P_E$, wherein $\beta$ is an energy efficiency coefficient, and the channel parameter vector is $\underline{h}$, wherein $\underline{h}=[h_1, h_2, \ldots, h_N]^T$. The total number of carriers is N, and the number of carriers allocated to the information signals and the number of carriers allocated to the energy signals are respectively $N_I$ and $N_E$, then $N=N_I+N_E$. The information symbol of the information baseband signal and the energy symbol of the energy baseband signal are $S_I(n)$ and $S_E(n)$, respectively, wherein $n=1, 2, \ldots, m$, and m is no more than N, wherein:

$$S_I(n) = \begin{bmatrix} S_{I1} \\ \ldots \\ S_{Im} \end{bmatrix}, S_E(n) = \begin{bmatrix} S_{E1} \\ \ldots \\ S_{Em} \end{bmatrix}$$

$S_{I1} \sim S_{Im}$ are the information symbols of the 1 to m information baseband signals, respectively, and $S_{E1} \sim S_{Em}$ are the energy symbols of the 1 to m energy baseband signals, respectively, and the energies of the information signals and the energy signals are represented by $E[S^2_I(n)]$ and $E[S^2_E(n)]$, respectively. Therefore, the power Q collected by the receiving terminal can be represented using the following relational expression:

$Q=<\underline{h},E[S^2_E(n)]>,i=1 \ldots N_i$ i.e.

$Q=h_1*E[S^2_E(1)]+h_2*E[S^2_E(2)]+ \ldots h_{N_E}*E[S^2_E(h_{N_E})]$ and the power $P_E$ of the energy signals can be represented using the following relational expression:

$$P_E = \sum_{n=1}^{N_E} E[S^2_E(n)]$$

The power, carrier and frequency spectrum of the information baseband signal and the energy baseband signal can be allocated and optimized according to the minimum operating power required by the receiving terminal and channel feedback information. It should be understood that the minimum operating power required by the receiving terminal is the minimum power required by the receiving terminal for various working modes. For example, under a non-charging mode, the minimum working power required by the receiving terminal may be the minimum power required by the circuit of the receiving terminal for operation, or under a charging node, the minimum working power required by the receiving terminal may be the sum of the minimum power required by the circuit of the receiving terminal for operation and the power for charging.

The power, carrier and frequency spectrum of the information baseband signal and the energy baseband signal can be allocated and optimized according to the minimum energy required by the receiving terminal for operation and channel feedback information.

In the embodiment, the first optimized target includes to minimize the number $N_E$ of carriers for energy signals and the total power $P_E$ of the energy signals in the case that the constraint condition is tenable.

The first constraint condition set comprises: C1, the power Q collected by the receiving terminal being greater than or equal to the minimum working power $P_{min}$ required by the receiving terminal, i.e., $Q \geq P_{min}$; C2, the total power of the energy signals on the sub-carrier of the transmitting terminal being less than or equal to the total power of the energy signals in the baseband signals; and C3, the mean power spectral density on each sub-carrier frequency band being less than or equal to a set parameter value A, i.e., satisfying $E[S^2_E(n)]/B \leq A$, wherein B is the channel bandwidth on each sub-carrier.

The first optimized parameter set includes one or more of the following parameters: a sub-carrier set $Sc_E$ for energy signals, the minimum working power $P_{min}$ required by the receiving terminal, the channel bandwidth B of each sub-carrier, the mean power spectrum density A of each sub-carrier and the channel parameter vector $\underline{h}$.

The first pre-allocated parameter includes one or more of the following parameters: the sub-carrier allocation set for energy signals, the power allocation set for energy signals and the total power $P_E$ of the energy signals.

In the embodiment, the second optimized target include to maximize the information transfer rate R in the case that the second constraint condition set is tenable. The second constraint condition set comprises: the total power of the information signal on the sub-carrier being less than or equal to the total power of the information signals in the baseband signals.

The second optimized parameter set includes one or more of the following parameters: the sub-carrier set for information signals $Sc_I$, the number $N_I$ of sub-carriers for information signals and the channel parameter vector $\underline{h}$, wherein $\underline{h}=[h_1, h_2, \ldots, h_N]^T$.

The second pre-allocated parameter set includes one or more of the following parameters: the power allocation set for information signals and the sub-carrier allocation set for information signals.

Given those, the pre-allocated parameter sets of a system can be obtained by solving the following optimization problems.

The first pre-allocated parameter set can be obtained according to the first optimized target and the first constraint condition set as follows.

min_$\{\underline{h}, Sc_E, P_{min}, B, A\}$ $P_E$, $N_E$, wherein the elements in $\{\}$ represent the first optimized parameter;

s.t. (the following is the first constraint condition)

$$Q = \langle \underline{h}, E[S_E^2(n)] \rangle, Q \geq P_{min},$$

$$\sum_{n=1}^{N_E} E[S_E^2(n)] \leq P_E,$$

$$E[S_E^2(n)]/B \leq A, n = 1, 2, \ldots, N_E$$

The second pre-allocated parameter set can be obtained according to the second optimized target and the second constraint condition set, as follows.

max_$\{\underline{h}, SC_E^*, Sc_I\}$ R, wherein $Sc_E^*$ is the optimum sub-carrier allocation set for energy signals;

s.t. (the following is the second constraint condition hereinafter)

$$\sum_{n=1}^{N_I} E[S_I^2(n)] \leq P_I.$$

Steps for solving the above optimization issues are illustrated as follows:

S1. Initializing $N_E=1$, and sub-carrier set $Sc_E=\Phi$ ($\Phi$ is a null set);

S2. Finding a sub-carrier allocation set for energy signals $Sc_E=\{Sci\}$, $i=1, 2, \ldots, N_E$ firstly, wherein a corresponding energy channel parameter vector is $\underline{h}_E=\{hi\}$, $i=1, 2, \ldots, N_E$, and then maximizing the power collected by the receiving terminal in the case that the first constraint condition set is tenable through an optimizing algorithm (for example, a water-filling algorithm). To be specific, the algorithm is as follows:

Sub-step S21:

Find $Sc_E = \{Sc_i\}, i = 1 \ldots N_E$:

s.t.

max $Q, Q \geq P_{min}$:

$$\sum_{n=1}^{N_E} E[S_E^2(n)] \leq P_E;$$

$E[S_E^2(n)]/B \leq A, n = 1, 2, \ldots, N_E$

Sub-step S22: a plurality of sets may be found through S21, and the optimum sub-carrier set for energy signal $Sc_E^*$=argmin $P_E$ is selected, wherein argmin $P_E$ represents the parameters when the minimum value of $P_E$ is obtained; and the optimum power allocation set for energy signals $\{E^*[S_E^2(n)]\}$ and the optimum power $Q^*=\langle \underline{h}, E^*[S_E^2(n)] \rangle$, $n=1, 2, \ldots, N_E$ collected at the receiving terminal are determined at the same time.

S3. If there is no solution in step S2, set $N_E=N_E+1$ and $Sc_E=\Phi$, and repeat steps S2 and S3.

S4. If there is a solution in step S2, then $Sc_E^*$ is determined, $N_E$ is determined, and $P_E$ is determined.

S5. When the optimum sub-carrier set for energy signals $Sc_E^*$ is determined, then the corresponding sub-carrier set for information signals $Sc_I$ is also obtained, wherein $Sc_I=\{Sci\}$; the number of sub-carriers for information signals $N_I=N-N_E$; and the corresponding information channel parameter vector $\underline{h}_I=\{hi\}$, wherein $i=1, 2, \ldots, N_I$.

The solving process for optimizing the information transfer rate of the system is as follows:

max_$\{\underline{h}, Sc_E^*, Sc_i\}R$ s.t.

$$\sum_{n=1}^{N_i} E[S_I^2(n)] <= P_I$$

The optimum power allocation set for information signals $\{E^*[S_I^2(n)]\}$ and the optimum sub-carrier set for information signals $Sc_I^*$ can be determined by solving to finally obtain the optimum information transfer rate $R^*$=argmax R, wherein $n=1, 2, \ldots, N_I$.

Wherein, the specific expression for $R^*$=argmax R is:

$$R^* = B \sum_{n=1}^{N_I} \log_2\left(1 + \frac{E^*[S_I^2(n)]}{N_0 B}\right)$$

Wherein, $n=1, 2, \ldots, N_I$, and $N_0$ is a noise power spectral density parameter.

The first pre-allocated parameter set and the second pre-allocated parameter set are obtained through the above optimizations.

The transmitter processes the first baseband signal and the second baseband signal in baseband signals into corresponding radio-frequency signals according to the first pre-allocated parameter set and the second pre-allocated parameter set and transmits the radio-frequency signals through antenna.

In the embodiment, the transmitter processes the energy baseband signal into a corresponding radio-frequency signal according to the sub-carrier allocation set for energy signals, the power allocation set for energy signals, and the total power of the energy signals in the first pre-allocated parameter set, and processes the information baseband signal into a corresponding radio-frequency signal according to the power allocation set for information signals and the sub-carrier allocation set for information signals in the second pre-allocated parameter, and transmits the foregoing radio-frequency signals through the antenna.

Figure 2:
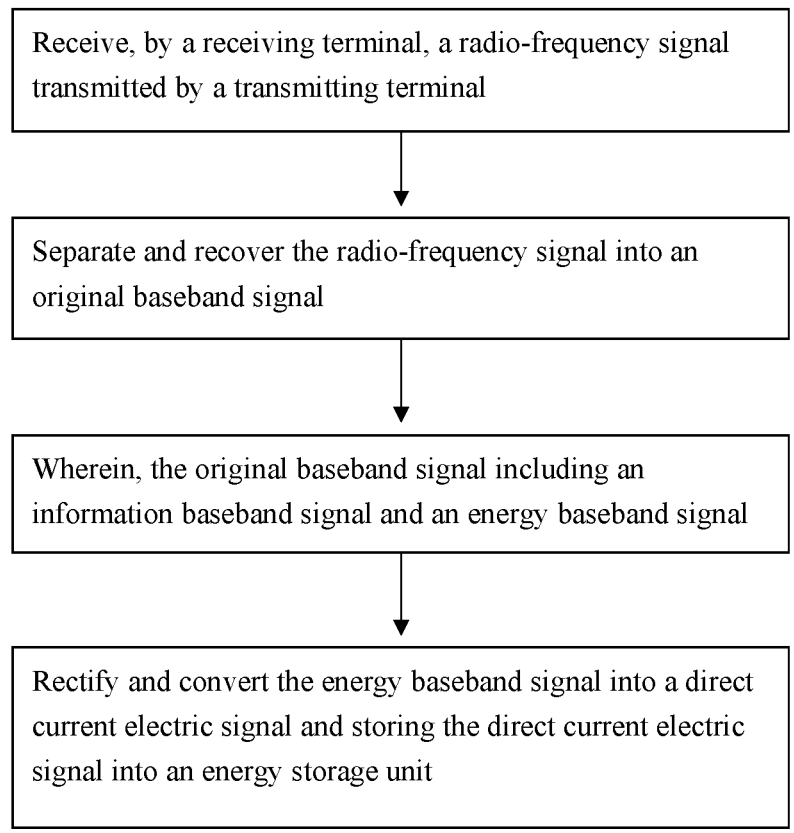
FIG. 2 is a flow diagram of a receiving method for simultaneous information and energy transfer.

FIG. 2 is a flow diagram of a receiving method for simultaneous information and energy transfer. As shown in FIG. 2, a receiving method for simultaneous information and energy transfer is shown, the method is applied to a receiving terminal device, and comprises:

receiving, by a receiving terminal, a radio-frequency signal transmitted by a transmitting terminal;

separating and recovering the radio-frequency signal into an original baseband signal;

wherein the original baseband signal comprises an information baseband signal and an energy baseband signal; and rectifying and converting the energy baseband signal into a direct current electric signal and storing the direct current electric signal into an energy storage unit.

The foregoing is merely some preferred embodiments of the invention, but is not intended to limit the invention; and any modification, equivalent replacement, improvement and the like made within the spirits and principles of the invention shall all fall within the protection scope of the invention.

What is claimed is:

1. A transmitting method for simultaneous information and energy transfer, applied in a transmitting terminal device, and comprising:

determining, by a transmitting terminal, a first pre-allocated parameter set of a first baseband signal based on a first optimized parameter set and according to a first optimized target and a first constraint condition set;

determining, by the transmitting terminal, a second pre-allocated parameter set of a second baseband signal based on a first optimized result and a second optimized parameter set and according to a second optimized target and a second constraint condition set; and processing the first baseband signal and the second baseband signal in baseband signals into corresponding radio-frequency signals according to the first pre-allocated parameter set and the second pre-allocated parameter set and transmitting the radio-frequency signals through an antenna;

wherein the first baseband signal and the second baseband signal are each one of an information baseband signal and an energy baseband signal in the baseband signals, and the first baseband signal is different than the second baseband signal.

2. The transmitting method for simultaneous information and energy transfer of claim 1, wherein the transmitting terminal is a multicarrier transmitter, the first baseband signal is an energy baseband signal, and the first optimized target involves minimizing the number of carriers for energy signals and the power of the energy signals in the case that constraint conditions are tenable, and the first constraint condition set comprises:

the power collected by a receiver being greater than or equal to the minimum operating power required by the receiver in a unit time;

the sum power of the energy signals on a sub-carrier being less than or equal to the total power of the energy signals; and the mean power spectral density over each sub-carrier frequency band being less than or equal to a predetermined parameter value.

3. The transmitting method for simultaneous information and energy transfer of claim 2, wherein the first optimized parameter set comprises one or more of the following parameters:

the minimum operating power required by the receiver;
the channel bandwidth on each sub-carrier;
the mean power spectral density on each sub-carrier; and
a channel parameter vector.

4. The transmitting method for simultaneous information and energy transfer of claim 2, wherein the first pre-allocated parameter comprises one or more of the following parameters:

a sub-carrier allocation set for energy signals;
a power allocation set for energy signals; and
the total power of the energy signals.

5. The transmitting method for simultaneous information and energy transfer of claim 2, wherein the frequency spectrum of the energy signals is spreading and then modulated to a pre-allocated carrier frequency band.

6. The transmitting method for simultaneous information and energy transfer of claim 1, wherein the transmitting terminal is a multicarrier transmitter, and the second baseband signal is an information baseband signal, and the second optimized target involves maximizing the information transfer rate in the case that the second constraint condition set is tenable, and the second constraint condition set comprises: the sum power of the information signals on a sub-carrier being less than or equal to the total power of the information signals.

7. The transmitting method for simultaneous information and energy transfer of claim 6, wherein the second optimized parameter set comprises one or more of the following parameters:

a sub-carrier set for information signals;
the number of sub-carriers for information signals; and
a channel parameter vector.

8. The transmitting method for simultaneous information and energy transfer of claim 7, wherein the second pre-allocated parameter set comprises one or more of the following parameters:

a power allocation set for information signals; and
a sub-carrier allocation set for information signals.

* * * * *